United States Patent [19]
Mosman et al.

[11] Patent Number: 5,743,288
[45] Date of Patent: Apr. 28, 1998

[54] VALVE HAVING PROVISION FOR REPLACING STEM PACKING WHILE THE VALVE IS UNDER PRESSURE

[75] Inventors: Bradley W. Mosman, Shawnee, Okla.; Frederick A. Hausler, III, Emporia, Kans.

[73] Assignee: ERC Industries, Inc., Houston, Tex.

[21] Appl. No.: 815,722

[22] Filed: Mar. 12, 1997

[51] Int. Cl.$^6$ .................. F16K 41/04; F16K 41/18; F16K 43/00
[52] U.S. Cl. .................. 137/315; 251/214; 251/327; 251/329; 251/330; 277/64; 277/105
[58] Field of Search .................. 137/315; 251/214, 251/326, 329, 330, 328, 327; 277/105, 106, 108, 51, 123, 64

[56] References Cited

U.S. PATENT DOCUMENTS

| | | | |
|---|---|---|---|
| 4,272,055 | 6/1981 | Herd | 251/214 |
| 4,294,427 | 10/1981 | Cilny | 251/86 |
| 4,356,832 | 11/1982 | Velan | 137/15 |
| 5,190,264 | 3/1993 | Boger | 251/214 |
| 5,238,252 | 8/1993 | Stewen et al. | 277/60 |
| 5,288,055 | 2/1994 | Fosnight et al. | 251/214 |
| 5,435,520 | 7/1995 | Vyvial | 251/196 |
| 5,454,547 | 10/1995 | Brown | 251/214 |

Primary Examiner—George L. Walton
Attorney, Agent, or Firm—Head, Johnson & Kachigian

[57] ABSTRACT

A valve, having provision for replacing stem packing while the valve is under pressure, has a valve body with a flow passageway through it, a gate that is vertically positioned to open and close the passageway, a stem extending upwardly from the valve body, the lower end being attached to the gate, a bonnet secured to the valve body by which the valve body open top is closed, the stem extending through an opening in the bonnet, a packing box slidably positioned in an opening in the top of the bonnet and receiving the stem, a back seat ring is positioned within the opening of the bonnet below the packing box and having a circumferential sealing surface surrounding the valve stem, the valve stem having an integral enlarged diameter shoulder so that when the stem is in the full upward position the packing box can be moved downwardly in the direction towards valve body forcing the back seat ring sealing surface to seal against the stem shoulder formed on the valve stem to permit packing retained within the packing box to be removed and replaced while the valve is under pressure.

10 Claims, 3 Drawing Sheets

VALVE HAVING PROVISION FOR REPLACING STEM PACKING WHILE THE VALVE IS UNDER PRESSURE

REFERENCE TO PENDING APPLICATIONS

This application is not related to any pending applications.

REFERENCE TO MICRO-FICHE APPENDIX

This application is not referenced in any microfiche appendix.

BACKGROUND OF THE INVENTION

This invention relates to a gate valve of the type in which the valve gate is moved between open and closed positions by a rising stem, that is, a stem extending from a bonnet in the top of the valve, that is, by a mechanism externally of the valve moved up and down to move the gate between open and closed positions. These types of valves are popular in industrial applications since they make possible a valve structure having a full opening, that is, when the valve is open the passageway is completely unobstructed. Further, this type of valve has the capability of securely closing fluid flow that is most important when the valve is used in high pressure applications.

Since this type of valve is particularly adaptable in high pressure applications and since it involves a stem that travels the full length of the movement required to fully open and fully close the gate within the valve, the packing around the stem that prevents fluid from flowing from the interior of the valve body to the environment must be replaced more frequently than with other types of valves which employ only a rotating stem. A typical procedure in industry is to provide packing around the valve stem in means to compress the packing so as to prevent leakage and the usual means includes the provision for adjusting the compression on the packing so as the packing wears the compression can be increased to shut off leakage of fluid past the valve stem and therefore extend the useful life of the valve packing. However, eventually the packing requires replacement and in many valve applications in use today, replacing the packing around a stem of a rising stem valve requires that all substantial pressure within the valve body be removed, that is, many valves in use today have no provision for retaining pressure within the valve body when the stem packing is removed. This requires that steps be taken to remove the valve from whatever process system it is employed which sometimes means shutting down significant processing operations.

To prevent having to shut down a process in order to remove pressure from a rising stem valve, others have suggested a provision of a back seat arrangement on the valve that functions to close the valve stem when the valve gate is in a fully opened position, that is, when the valve stem is in the fully raised position so as to permit removing the stem packing. This system is accomplished by providing a back seat on the valve stem, that is, an enlarged diameter portion on the valve stem that provides an annular seating surface thereon which can, when the valve is in the fully opened position, engage a sealing surface in the portion of the valve that guides the valve stem so as to permit removal of valve stem packing. Such arrangement has also been employed in valves to add fire protection, that is, since the back seat feature on a valve stem can be designed in a way so that sealing is accomplished by metal-to-metal seals, rather than using elastomeric seals that would fail more readily in the event of fire.

For background information to rising stem valves that employ a back seat feature, reference may be had to U.S. Pat. No. 4,272,055 issued Jun. 9, 1981 and entitled "Single Double Back Seat". Another patent that provides good background information is U.S. Pat. No. 5,435,520 that issued on Jul. 25, 1995 entitled "Back Stop Assembly For An Expanding Gate Valve".

These two patents are illustrative of the state of the art which the present invention pertains.

For further background information relating to the subject of this invention, please see the following United States patents:

| PATENT NO. | INVENTOR | TITLE |
| --- | --- | --- |
| 4,294,427 | Cilny | Mono-Seat Gate Valve |
| 4,356,832 | Velan | High Pressure Bonnetless Valve |
| 5,190,264 | Boger | Adjustable Valve Packing Arrangement |
| 5,238,252 | Stewen et al | Shut-Off Fittings With A Sealing Device |
| 5,288,055 | Fosnight et al | Brace For a Valve Packing Gland Flange |
| 5,454,547 | Brown | Sleeved Seal For A Valve |

BRIEF SUMMARY OF THE INVENTION

The invention provides an improved valve having the provision for replacing stem packing while the valve is under pressure. The valve has a valve body with an open top and a flow passageway through the body. A gate is positioned within the valve body that is vertically moveable to open and closed positions, that is, to open and close the flow passageway through the valve body. The gate is upwardly displaced to open the valve body, that is, to move the gate out of the flow passageway through the valve body and is moved to a downward position to extend between and seal against valve ports within the body to close the valve. The gate is moved by an axially advanced and retracted valve stem that extends upwardly through an opening in a bonnet which closes the top of the valve.

The bonnet is provided with a recess in the upper surface thereof that is coaxial with the stem receiving opening. Positioned within the recess is a packing box. More particularly the packing box is both slidably and sealably positioned in the bonnet opening. The packing box has an opening therethrough coaxially receiving the stem.

Secured within the opening in the bonnet below the packing box is a back seat ring having an opening therethrough that receives the stem. The back seat ring has at the bottom end thereof an enlarged bottom recess that includes an annular sealing surface surrounding the valve stem.

Formed with the valve stem, and preferably integrally formed with it, is an enlarged external diameter annular stem shoulder that is receivable within the back seat ring recess when the valve stem is in its upward position.

The packing box includes provision for receiving packing therein surrounding the valve stem.

Also receiving the valve stem is a packing gland having an opening therethrough that receives the valve stem and having a tubular portion on a lower end thereof that is telescopically received in the packing box and in engagement with packing surrounding the valve stem. The packing gland is secured to the bonnet by upwardly extending both that extend through openings in an integral flange portion of the packing gland so that by the use of nuts the packing gland energizer can be forced downwardly, compressing the packing within the packing box that surrounds the valve stem.

The packing box itself is vertically displaceable relative to the valve bonnet which in turn elevationally positions the back seat ring.

When the valve stem is in the full upper position and when an operator desires to remove and replace the packing that surrounds the stem within the packing box, the packing box is advanced downwardly, moving the back seat with its sealing surface into engagement with the stem back seat ring. This forms a metal-to-metal seal against escape of fluids along the valve stem. The operator may then remove the packing gland energizer and then the stem packing so that the stem packing can be replaced. After replacement of the stem packing, the packing gland energizer is moved back into position to compress the packing around the stem after which the packing box can be slidably upwardly raised to raise the back seat ring out of engagement with the stem shoulder. In this way the stem shoulder formed on the valve stem engages the sealing surface in the back seat ring only when it is necessary to replace the packing within the packing box. In other words, by this arrangement the back seat ring is positioned so that it does not engage the stem shoulder formed on the valve stem during the normal use of the valve stem to open and close the valve to thereby avoid wear between the valve stem shoulder and the sealing surface in the back seat ring.

A better understanding of the invention will be obtained from the following description of the preferred embodiments and the claims, taken in conjunction with the attached drawings.

DESCRIPTION OF THE DRAWINGS

FIG. 1 is typical of the type of valve to which this invention pertains and is illustrated only as an example of this type of valve, it being understood that FIG. 1 is not intended to show features which are unique to this invention.

DETAILED DESCRIPTION OF THE PREFERRED EMBODIMENTS

Figure 1:
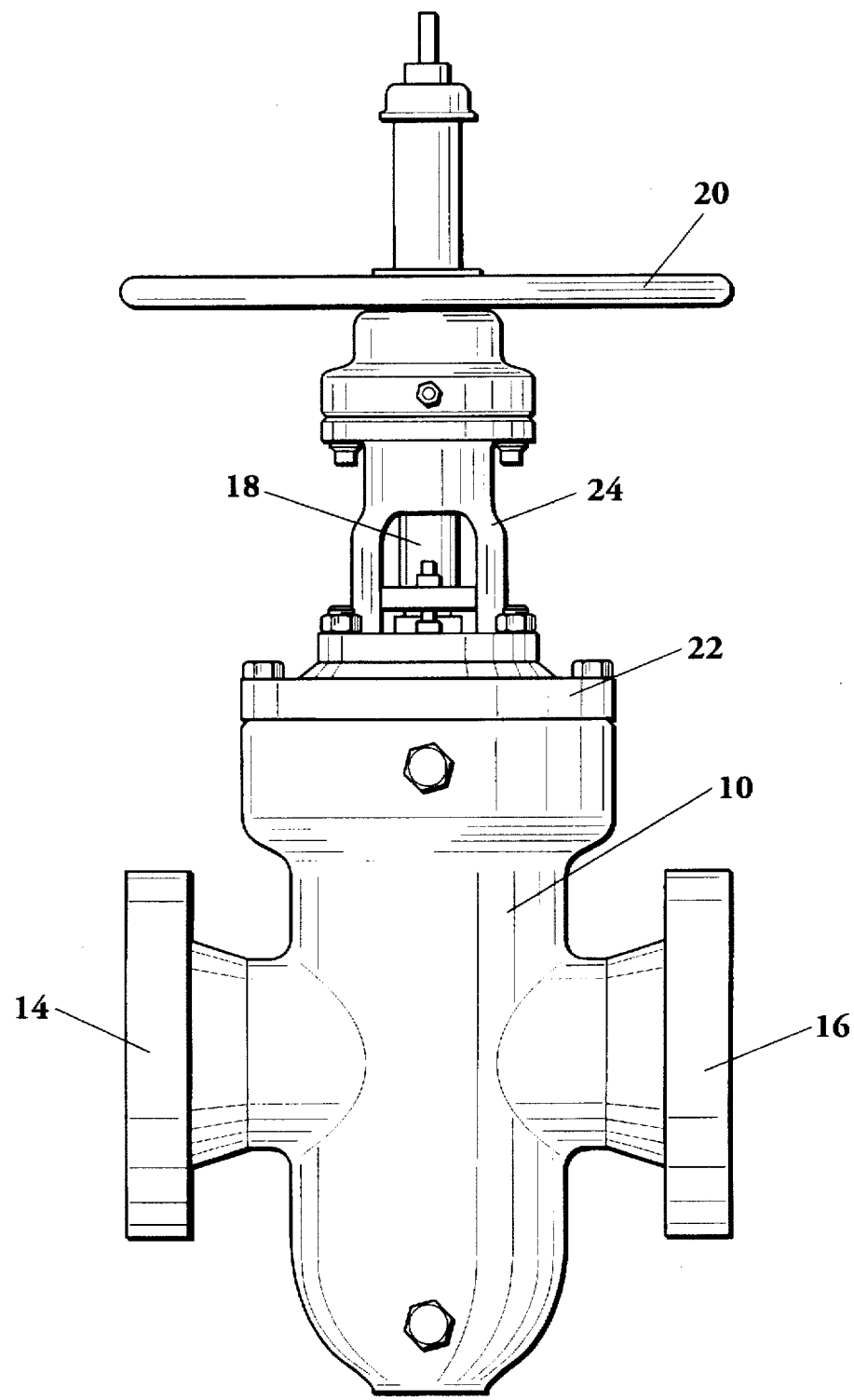
FIG. 1 is an elevational view of a rising stem gate valve incorporating the principals of this invention.

FIG. 1 is an external view of a type of valve that employs the invention to be described. In FIG. 1 a valve body 10, usually of cast metal, has opposed flanges 14 and 16 by which the valve can be secured to piping or other process apparatus. Instead of flanges some types of valves have threaded or other types of fittings. In any event, the valve of this invention is typically a rising stem gate valve in which operation of the valve, that is, to open or close fluid flow through the valve is accomplished by means of a stem 18 that is elevationally raised or downwardly positioned to open and close the valve. Positioning stem 18 is accomplished typically by a hand wheel 20, that is, by rotating hand wheel 20 stem 18 is elevationally positioned up or down to open and/or close the valve.

Secured to the top of valve body 10 is a bonnet 22 and to the top of bonnet 22 a yolk 24, the yolk being open to reveal stem 18.

Figure 2:
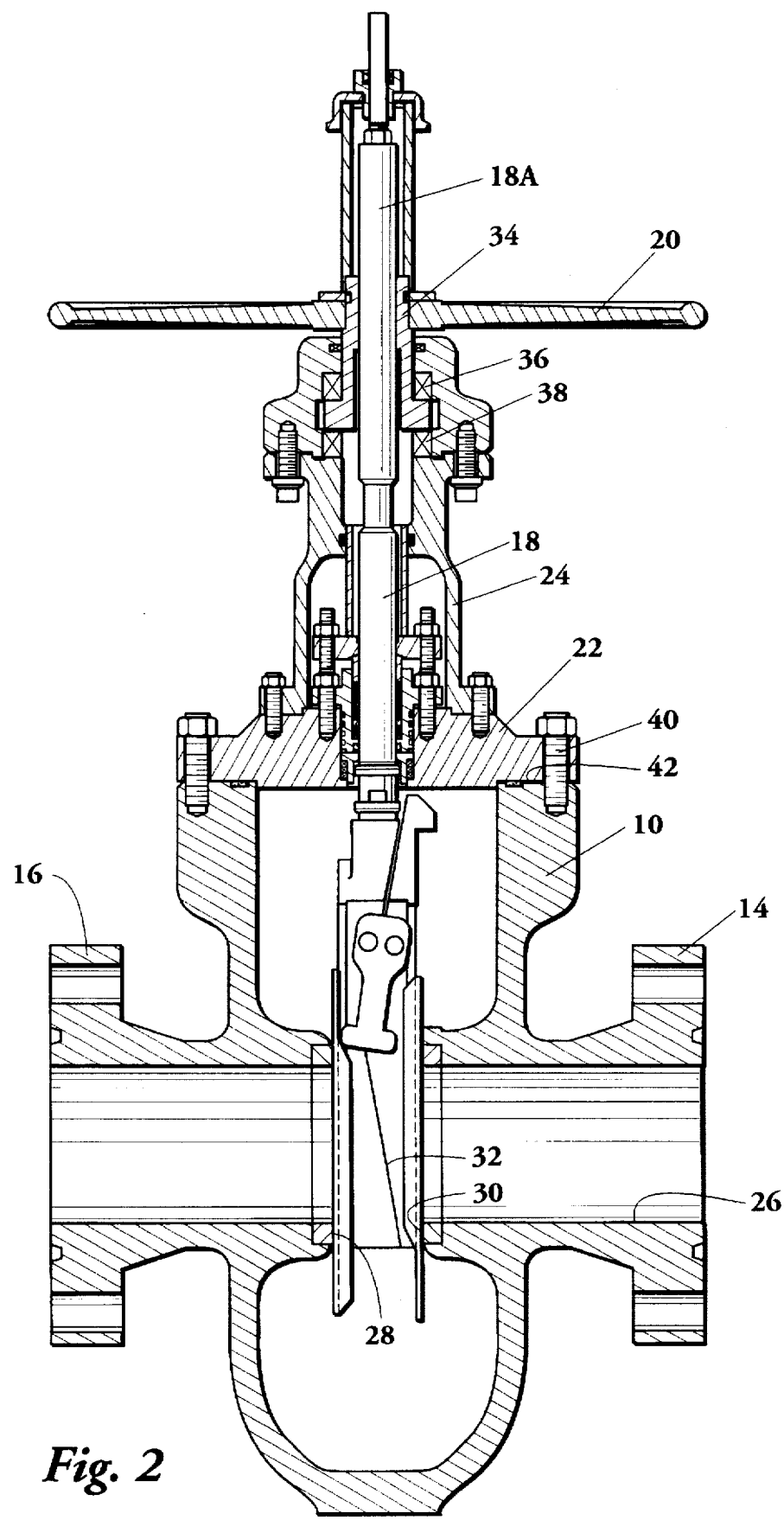
FIG. 2 is a cross-sectional view, slightly enlarged of the valve of FIG. 1, showing a rising stem gate valve and showing the unique concept of this invention wherein an improved back seat arrangement is provided that enables an operator to seal the valve when it is necessary to replace the packing surrounding the valve stem but wherein the back seat feature is taken out of operation when not required for facilitating removal and replacement of the stem packing.

FIG. 2 is a cross-sectional view of the valve of FIG. 1 showing the body 10 with flanges 14 and 16, stem 18, hand wheel 20, bonnet 22 and yolk 24. These basic elements of the valve are more or less standard in rising stem gate valves. Positioned within the interior of valve body 10 is a flow passageway 26 that is surrounded by sealing surfaces 28 and 30. Receivable between sealing surfaces 28 and 30 is a gate 32 that is vertically positioned by stem 18, that is, gate 32 is secured to the lower end of stem 18.

Supported above yolk 24 is the mechanism that functions to raise and lower the valve. Typically the upper portion of stem 18, indicated by the numeral 18A is externally threaded that receives a hand wheel nut 34 that is internally threaded, the hand wheel nut being secured to hand wheel 20. Bearings 36 and 38 retain hand wheel nut 34 but permit its easy rotation. Thus, by rotating hand wheel 20 in one direction stem 18 is elevationally raised, and by rotating the hand wheel in the opposite direction downwardly positions the hand wheel. All of the features described to this point are typical of rising stem gate valves and form the background to which this invention applies.

Figure 3:
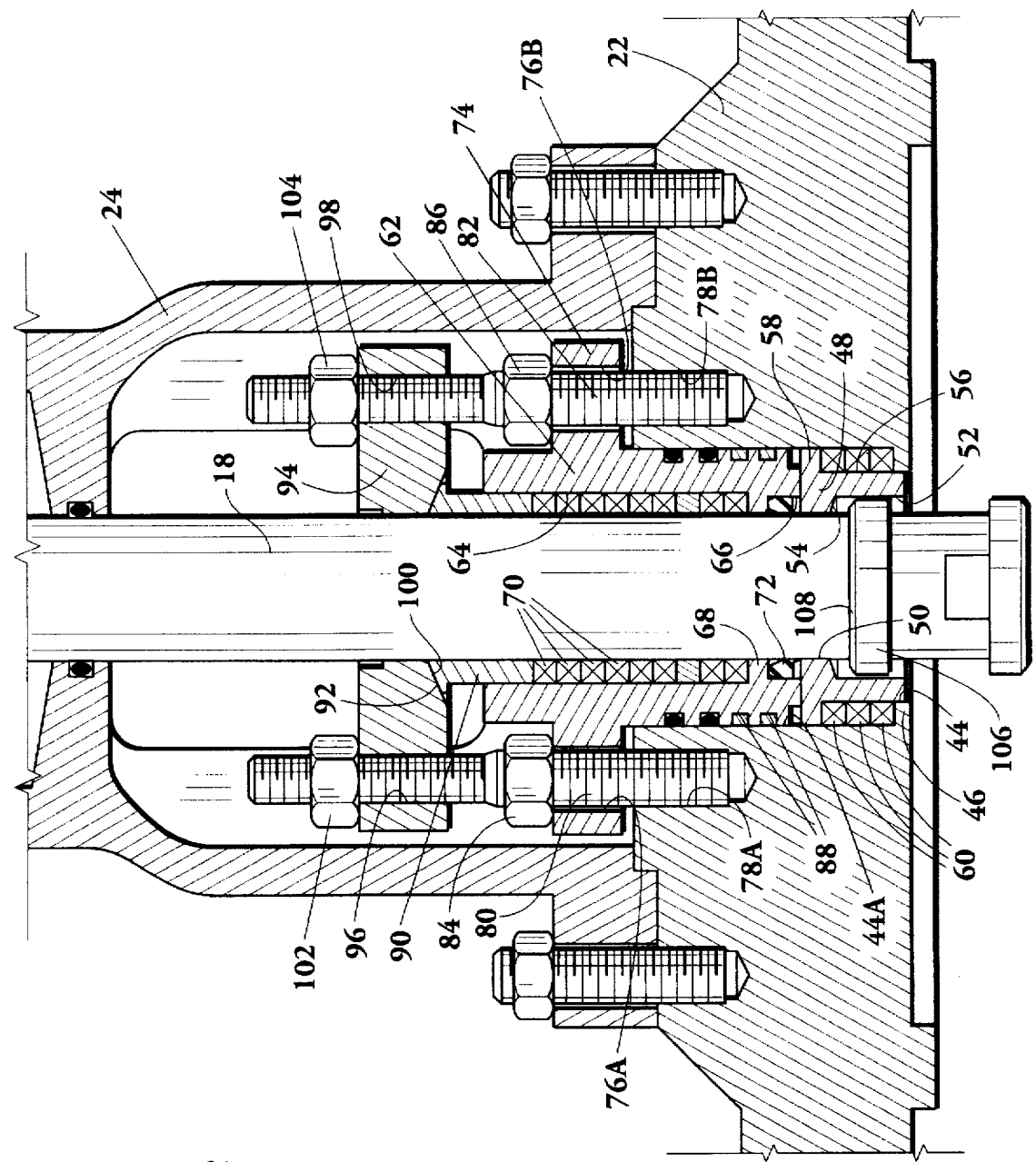
FIG. 3 is an enlarged fragmentary elevational view of a portion of the valve of FIG. 1 showing the critical features of the invention.

The essence of the invention is best understood now by reference to FIG. 3 which is an enlarged cross-sectional fragmentary view of the intermediate portion of the valve, that is, the portion of the valve from bonnet 22 and the mechanism that is positioned within yolk 24. As shown in FIG. 2, bonnet 22 is secured to the top of valve body 10 by bolts 40, the bonnet serving to close the open top end 42 of valve body 10. As seen in FIG. 3, bonnet 22 has an opening 44 therethrough, opening 44 having an enlarged internal diameter upper portion 44A, the difference in diameters between openings 44 and 44A providing an internal circumferential ledge 46.

Received within openings 44 and 44A is a back seat ring 48 which, in turn, has an axial opening 50 therethrough that closely receives stem 18. Back seat ring 48 has, in the lower end thereof, a cylindrical recess 52 that provides a circumferential sealing surface 54 that surrounds stem 18.

The exterior of back seat ring 48 has two diameters, a first smaller diameter portion 56 and a shorter length larger diameter portion that forms a circumferential ledge 58.

Positioned exteriorly of back seat ring 48 and within opening 44A in bonnet 22 are packing rings 60 that seal the exterior of back seat ring 48 to bonnet 22.

Positioned partially within opening 44A in the bonnet is a packing box 62.

Packing box 62 has an upper cylindrical recess 64 that communicates with the upper end of the packing box and a lower, shorter length recess 66, recesses 64 and 66 being separated by an integral circumferential ledge 68. Positioned within upper recess 64 above ledge 68 is a series of packing rings 70 that surround stem 18. Positioned within the lower recess 66 in packing box and surrounding stem 18 is a stem scraper 72. The function of stem scraper 72 is, as the term implies, to scrape the surface of the stem as it is raised and lowered in the valve body, therefore, the stem scraper is slightly elevationally positioned in response to movement of the stem. The stem scraper is not intended to perform a seal function which instead is accomplished by packing rings 70.

Packing box 62 has an integral circumferential flange 74 that has at least two spaced apart openings therein, two such openings 76A and 76B being shown in FIG. 3. Bonnet 22 has, in its upper surface, at least two spaced apart threaded openings 78A and 78B that receive the lower end of bolts 80 and 82, bolt 80 extending through opening 76A and bolt 82 through opening 76B of packing box 62. Received on bolts 80 and 82 respectively are nuts 84 and 86. By tightening nuts 84 and 86 packing box 62 can be vertically downwardly displaced which, in turn, vertically downwardly displaces back seat ring 48. Back seat ring 48 and packing box 62 are subjected to the internal pressure of the valve body and when the valve is under pressure the back seat ring 48 and packing box 62 are slidably upwardly displaced slightly, their upper position being limited by the position of nuts 84 and 86.

Formed on the exterior surface of packing box 62 below flange 74 are a plurality of circumferential grooves 88 that receives seals, such as metal seal rings or high temperature elastomeric seals, so that the exterior surface of the packing box is sealed to bonnet 22.

Received about stem 18 above packing box 62 is a packing gland 90 that is basically tubular but has an upper arcuate surface 92. Positioned above the packing gland 90 is a packing gland energizer 94 that is essentially in the form of a circumferential flange that has spaced apart openings 96 and 98 therein that receives bolts 80 and 82 respectively. Packing gland energizer 94 has, on its lower surface, a concave arcuate surface 100 that matches packing gland convex surface 92. When nuts 102 and 104 are threadably downwardly advanced, packing gland energizer 94 forces packing gland 90 downwardly to the cylindrical recess 64 in packing gland box 62, engaging packing rings 70 to compress the packing rings and seal the exterior surface of stem 18. By periodically downwardly threading nuts 102 and 104 compression on packing rings 70 can be adjusted to compensate for wear of the packing rings as a consequence of the vertical upward and downward positioning of stem 18. However, it is obvious that eventually packing rings 70 will lose their ability to retain pressures, particularly high pressures from within the interior of the valve body and therefore, it is evitable that such packing rings need to be periodically replaced.

To prevent opening the passage of contents from within the valve along the valve stem when packing rings 70 are replaced, valve stem 18 is provided with an enlarged integral diameter portion 106 providing a circumferential stem shoulder 108. When stem shoulder 108 is pressed against sealing surface 54 of back seat ring 48, a metal-to-metal seal is provided to prevent escape of fluid along the valve stem.

To make use of the improved valve of this invention, when an operator desires to replace packing rings 70, the operator actuates the hand wheel to raise stem 18 to its maximum upper position, that is, typically the valve open position. To seal against the passage of fluid along the valve stem, nuts 84 and 86 are rotated to move packing box 62 axially downwardly towards the valve body thereby forcing packing ring 48 axially downwardly, compressing packing rings 60 and moving back seat ring sealing surface 54 into contact with the valve stem shoulder 108, thereby closing the flow along the valve stem. After which nuts 102 and 104 may be removed, allowing the removal of packing gland energizer 94 and packing gland 90 to provide access to packing rings 70 which may then be removed and replaced. After replacement, packing gland 90 and packing gland energizer 94 are moved back into position, nuts 102 and 104 replaced and packing rings 70 placed under sufficient compression to prevent leakage. Thereafter, nuts 84 and 86 can be rotated to permit packing box 62 and back seat ring 48 to be upwardly slidably displaced, separating sealing surface 54 from stem shoulder 108. In this manner, the only time there is contact between stem shoulder 108 and sealing surface 54 is when an operator desires to replace the packing, that is, with the back seat ring 48 slightly upwardly displaced, the sealing surfaces do not come into contact during normal valve operation. When valve stem 18 is fully upwardly positioned in the valve fully open condition, the sealing surface 54 and stem shoulder 108 are not engaged thus eliminating wear that would otherwise take place if there was no provision for the optional displacement of packing box 62 and back seat ring 48. This feature provides improved closure of the valve when packing ring 70 is removed and adds to the useful life of the valve by eliminating wear that would otherwise occur each time the valve is open to the full upper position.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A valve having provision for replacing stem packing while the valve is under pressure, comprising:

a valve body with an open top and a flow passageway therethrough;

a gate within said body that is vertically positioned to open and close said flow passageway;

a stem extending upwardly from said valve body, a lower end of the stem being secured to said gate by which said gate is vertically positioned and having above the lower end, an enlarged diameter stem shoulder;

a bonnet secured to said valve body by which said valve body open top is closed, the bonnet having a stem receiving opening therein;

a packing box sealably and vertically positionable in said bonnet opening and having an opening therethrough receiving said valve stem;

packing received within said packing box opening and surrounding said valve stem;

a packing gland having an opening therethrough receiving said valve stem and having a tubular portion on a lower end thereof telescopically received in said packing box opening and in engagement with and for sealably compressing said packing around said valve stem;

a back seat ring having an opening therethrough receiving said stem above said stem shoulder and being slidably and sealably received within said bonnet opening below said packing box, and being positionable by positioning of said packing box and having an annular sealing surface surrounding said valve stem, said back seat ring and said packing box being urged upwardly by internal fluid pressure within said valve body and an adjustable means for vertically positioning said packing box whereby when said valve stem is in a full upward position said packing box and said back seat ring can be selectably downwardly positioned so that said valve stem annular shoulder sealably engages said back seat ring sealing surface to close flow along said valve stem and to thereby permit said packing received within said packing box upper recess to be removed and replaced.

2. A valve according to claim 1 wherein said annular stem shoulder is integrally formed with said valve stem.

3. A valve according to claim 1 wherein said packing box has an integral enlarged diameter flange portion having at least two spaced apart bolt openings therethrough and including:

a bolt received in each of said packing box bolt openings and secured at one end to said bonnet whereby said packing box may be selectably positioned relative to said bonnet.

4. A valve according to claim 1 wherein said packing gland has an integral enlarged diameter flange portion having at least two spaced apart bolt openings therethrough and including:

a bolt received in each of said packing gland bolt openings and secured at one end to said bonnet whereby said packing gland may be selectably positioned relative to said bonnet.

5. A valve according to claim 1 wherein said packing box and said packing gland each has an integral enlarged diameter flange portion each having at least two spaced apart bolt openings therethrough, the bolt openings in said packing box and said packing gland being in alignment with each other;

a bolt received in each of said packing box and packing gland aligned openings and secured at one end to said bonnet; and a first set of nuts received on said bolts in engagement with packing box flange and a second set of nuts received on said bolts in engagement with packing gland whereby the positions of said packing box and packing gland can be selectably varied relative to said bonnet employing the same bolts.

6. A valve having provision for replacing stem packing while the valve is under pressure, comprising:

a valve body with an open top and a flow passageway therethrough;

a gate within said body that is positioned to open and close said flow passageway;

a stem extending upwardly from said valve body, a lower end of the stem being secured to said gate by which said gate is positioned and having above the lower end, an enlarged diameter stem shoulder;

a bonnet secured to said valve body by which said valve body open top is closed, the bonnet having a stem receiving opening therein;

a packing box sealably positioned in said bonnet opening and having an opening therethrough receiving said valve stem;

packing received within said packing box opening and surrounding said valve stem;

a packing gland having an opening therethrough receiving said valve stem and having a tubular portion on a lower end thereof telescopically received in said packing box opening and in engagement with and for sealably compressing said packing around said valve stem;

a back seat ring having an opening therethrough receiving said stem above said stem shoulder and being slidably and sealably received within said bonnet opening below said packing box, and having an annular sealing surface surrounding said valve stem, said back seat ring and said packing box being urged upwardly by internal fluid pressure within said valve body; and an adjustable means to vertically position said packing box and said back seat ring, whereby when said packing box and said back seat ring is selectably downwardly positioned with respect to said bonnet said valve stem annular shoulder sealably engages said back seat ring sealing surface to close flow along said valve stem and to thereby permit said packing received within said packing box upper recess to be removed and replaced.

7. A valve according to claim 6 wherein said packing box is vertically positionable within said bonnet opening and has a lower end in engagement with said back seat ring, said means of vertically positioning said back seat ring includes vertically positioning of said packing box.

8. A valve according to claim 7 wherein said packing box has an integral enlarged diameter flange portion having at least two spaced apart bolt openings therethrough and including:

a bolt received in each of said packing box bolt openings and threadably secured at one end to said bonnet whereby said packing box may be selectably positioned relative to said bonnet to thereby vertically position said back seat ring.

9. A valve according to claim 7 wherein said packing gland has an integral enlarged diameter flange portion having at least two spaced apart bolt openings therethrough and including:

a bolt received in each of said packing gland bolt openings and threadably secured at one end to said bonnet whereby said packing gland may be selectably positioned relative to said bonnet to selectably compress said packing in said packing box.

10. A valve according to claim 7 wherein said packing box and said packing gland each has an integral enlarged diameter flange portion each having at least two spaced apart bolt openings therethrough, the bolt openings in said packing box and said packing gland being in alignment with each other;

a bolt received in each of said packing box and packing gland aligned openings and secured at one end to said bonnet; and a first set of nuts received on said bolts in engagement with packing box flange and a second set of nuts received on said bolts in engagement with packing gland whereby the positions of said packing box and packing gland can be selectably varied relative to said bonnet employing the same bolts.

* * * * *

UNITED STATES PATENT AND TRADEMARK OFFICE
CERTIFICATE OF CORRECTION

PATENT NO. : 5,743,288
DATED : April 28, 1998
INVENTOR(S) : Bradley W. MOSMAN et al.

It is certified that error appears in the above-indentified patent and that said Letters Patent is hereby corrected as shown below:

Cover page, "[56] References Cited", add the following U.S. PATENT DOCUMENTS

| -- | 2,305,589 | 12/1942 | Stark et al. | 251/329 |
|---|---|---|---|---|
| | 2,305,590 | 12/1942 | Marburg et al. | 251/329 |
| | 2,426,392 | 8/1947 | Fennema | 251/329 |
| | 2,780,233 | 2/1957 | Volpin | 251/214 |
| | 2,787,439 | 4/1957 | Bredtschneider | 251/329 |
| | 3,152,786 | 10/1964 | Soderberg et al. | 251/330 |
| | 3,162,453 | 12/1964 | Magos et al. | 251/214 |
| | 3,993,285 | 11/1976 | Conley | 251/329 |
| | 4,289,317 | 9/1981 | Kuc | 251/330 |
| | 4,601,304 | 7/1986 | Schobl | 251/214 |
| | 4,878,677 | 11/1989 | Larkins et al. | 277/105 |
| | 5,234,194 | 8/1993 | Smith | 251/214 -- |

Signed and Sealed this

Twenty-first Day of July, 1998

*Attest:*

BRUCE LEHMAN

*Attesting Officer*     *Commissioner of Patents and Trademarks*